United States Patent [19]

Lidstone et al.

[11] 4,218,223

[45] Aug. 19, 1980

[54] PRE-CLEANER FOR COMBUSTION ENGINES

[75] Inventors: James E. Lidstone, St. Louis Park; Richard J. Osendorf, St. Paul, both of Minn.

[73] Assignee: Donaldson Company, Inc., Minneapolis, Minn.

[21] Appl. No.: 854,515

[22] Filed: Nov. 25, 1977

[51] Int. Cl.[2] .......... B01D 45/16

[52] U.S. Cl. .......... 55/1; 55/385 F; 55/431; 55/454; 55/455; 55/460

[58] Field of Search .......... 55/1, 385 F, 261, 424, 55/399, 431, 454, 455, 459 A, 460; 209/144

[56] References Cited

U.S. PATENT DOCUMENTS

| | | | |
|---|---|---|---|
| 1,405,399 | 2/1922 | Donaldson | 55/455 |
| 1,556,592 | 10/1925 | Donaldson | 55/455 |
| 2,354,311 | 7/1944 | Harlow | 209/144 |
| 3,236,045 | 2/1966 | Berger et al. | 55/261 |
| 3,358,844 | 12/1967 | Klein et al. | 209/144 |
| 3,720,314 | 3/1973 | Phillippi | 209/144 |
| 3,792,573 | 2/1974 | Borsheim | 55/431 |
| 3,917,568 | 11/1975 | Klein et al. | 209/144 |
| 3,920,426 | 11/1975 | Tu et al. | 55/455 |
| 3,972,698 | 8/1976 | Klein et al. | 55/431 |
| 4,014,673 | 3/1977 | Kinnison | 55/455 |
| 4,028,076 | 6/1977 | Fields | 55/431 |

*Primary Examiner*—Tim R. Miles
*Assistant Examiner*—Gregory N. Clements
*Attorney, Agent, or Firm*—Merchant, Gould, Smith, Edell, Welter & Schmidt

[57] ABSTRACT

Apparatus for, and the method of, cleaning air, for engines and related uses, including an air cleaner with a body having a vertical axis and including a cylindrical wall, a solid top closure, and a bottom closure including an axial, reentrant, cleaned air outlet conduit defining with the wall a lower annular space, the wall being provided with a lateral scavenge outlet to the annular space below the upper end of the outlet conduit, with a plurality of inwardly formed spirally oriented peripheral ambient air inlet louvers spaced therearound above the upper end of the outlet conduit, and with a bleeder arrangement including a plurality of secondary ambient air inlet ports spaced around the wall above the louvers and adjacent the lid, the arrangement being designed for connection of the outlet conduit to the inlet of an engine, to enable air flow to the engine inwardly through the louvers and the bleeder means, and for connection of the scavenge outlet to aspirating apparatus such as an aspirator actuated by the exhaust of the engine, for causing a scavenging flow of air from the annular space.

11 Claims, 4 Drawing Figures

FIG. 1
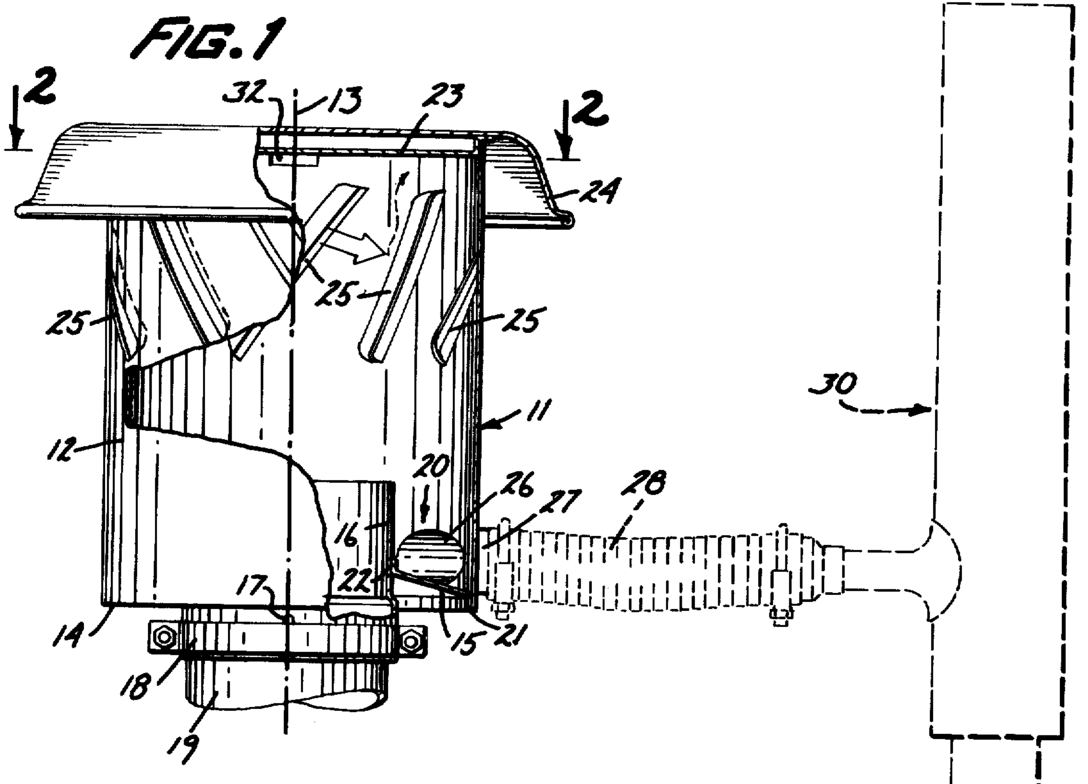
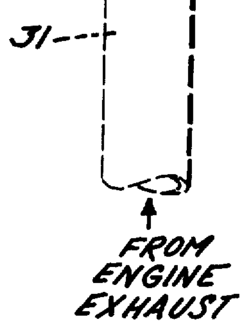
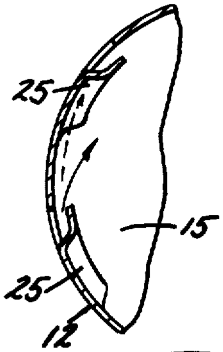
FIG. 4
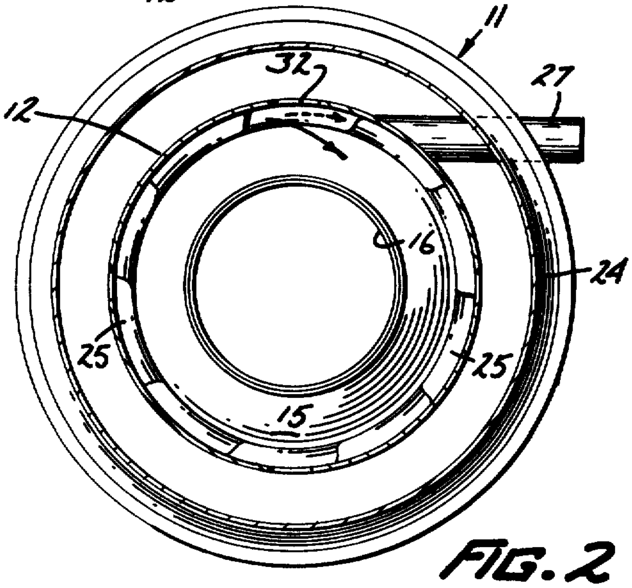
FIG. 2
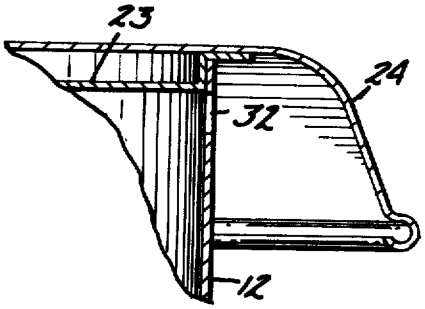
FIG. 3

PRE-CLEANER FOR COMBUSTION ENGINES

BACKGROUND OF THE INVENTION

This invention relates to the field of air cleaning, and particularly to a new air cleaner for precleaning use with agricultural machinery which must operate in an environment of airborne chaff.

In such environments the life of an air filter if used alone is impractically short, and the practice has arisen of installing a centrifugal cleaner in the line conducting ambient air to the filter, to remove the larger particles which otherwise quickly clog the filter. In such installations the centrifugal cleaner is known, from its spatial location, as a precleaner. By its use the service life of a subsequent air filter is greatly extended, and by scavenging the centrifugal precleaner a very acceptable overall system results.

We are aware that it is known to mount a centrifugal precleaner having a closed top with its axis vertical, ambient air being drawn in through spiral louvers around the upper portion of the device, and treated air being drawn out through a reentrant axial outlet conduit in the otherwise closed bottom, and a tangential scavenger opening being provided in the lower portion for connection to a suitable aspirator to continuously dispose of centrifugally separated particulate matter. The principal flow of air through the cleaner is helically downward, and a parasitic eddy of air is present at the top of the cleaner.

This arrangement has several advantages, but suffers from an imperfection in operation, particularly where the air ambient to the device is laden with pollutants of low density such as particles of chaff. We have found that a considerable part of this material is deflected upwardly into the eddy just mentioned, during precleaner operation, to form a continuously rotating central mass at the top of the precleaner: when the flow of air is terminated, as by shutting down an engine being supplied therewith, the eddy disintegrates and the circling mass of chaff simply drops down into the outlet conduit, to be ingested when the air flow is next resumed: this of course is undesirable.

SUMMARY OF THE INVENTION

Our invention overcomes the disadvantage just described by providing the precleaner with bleeder means in the form of a plurality of small radial apertures or ports at its top. These apertures admit to the precleaner a quantity of ambient air which, while small compared to that admitted by the louvers, is nevertheless sufficient in quantity and proper in direction to prevent the formation of central eddy at the top of the precleaner, so that no spinning mass of chaff accumulates there.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing,

FIG. 1 is a side view of a precleaner embodying the invention, with parts broken away or shown in section, and with accessory items shown in phantom;

FIG. 2 is a sectional view taken along the line 2—2 of FIG. 1, and;

FIGS. 3 and 4 are enlarged fragmentary sectional views of portions of the precleaner.

DESCRIPTION OF THE PREFERRED EMBODIMENT

As shown in the drawing, our precleaner comprises a body 11 having a cylindrical metal wall 12 arranged with its axis 13 vertical. The bottom 14 of the device is closed by an annular partition 15 through which there passes an axial outlet conduit 16 for precleaned air, suitably slotted as at 17 for connection by a clamp 18 to a vertical conduit 19 leading to an engine, not shown, to which precleaner air is to be supplied, and which may include an air filter or other second cleaning stage if desired. Conduit 16 is reentrant into body 11 for a considerable distance, to define with wall 12 an annular channel 20, and partition 15 is securely sealed to body 11 at 21, and to conduit 16, at 22. A solid closure or lid 23 is pressed into and secured to body 11 at its top end, and a rain cap 24 is preferably secured to lid 23 unless this protection is not desired.

A set of ten inwardly formed louvers 25 are evenly spaced around the upper part of body 11 to comprise the principal inlet for ambient air to the precleaner. The louvers are spirally oriented at a helix angle of 35°, to give the entering air a tangential and slightly downward component of motion. A lateral opening 26 is provided near the bottom of body 11, below the top of conduit 16, to which is secured a tangential conduit 27 for connection as suggested at 28 to a suitable aspirating arrangement 30 which may conveniently be actuated by exhaust gases from the engine, supplied at 31. The direction of tangency of conduit 27 is of course coordinated with the direction of flow of air through the precleaner, and the outflow through connection 28 may be about ten percent of the total outflow from the device.

At the top of the precleaner, in line with the inner surface of lid 23, there are provided bleeder means comprising a number of secondary air inlet ports 32, which are located symmetrically about axis 13 of body 11. In the drawing, four such ports are shown, which appears to be a practical minimum number. The symmetry and axial location of these ports are more critical than their actual dimensions or number. We have found that a total port area equal to about one-fifteenth of the louver area is quite satisfactory for the purpose of preventing a whirling mass of chaff from collecting at the top of the precleaner.

In one successful embodiment of the invention the following dimensions were found satisfactory.

Diameter of Body 11—9 in.
Length of Body 11—$9\frac{3}{4}$ in.
Number of Louvers 25—10
Total Louver Area—15 in.$^2$
Number of Ports 32—4
Total Port Area—1 in.$^2$
Diameter of Conduit 16—$4\frac{1}{2}$ in.
Diameter of Conduit 26—$1\frac{1}{2}$ in.
Throughput—450 CFM
Restriction at 450 CFM—4.1 in.($H_2O$)

Operation

The operation of our precleaner in a system such as that suggested is as follows. When the engine is in operation, air is drawn thereto through conduit 19, and the engine exhaust gas supplied at 31 creates an aspirating suction at 26. As a result, air is drawn into the precleaner through louvers 25, and to a lesser extent through ports 32, to pass out through conduit 16, and to a lesser extent through conduit 27. The principal flow of air in body 11 is helically downward, and its rotary components causes centrifugal displacement of particulate matter radially outwardly, to move gravitationally down the inner wall of body 11 into annular space 20. From here it is scavenged by aspiration through conduit 28 and discharged with the exhaust from aspirator 30.

As the ambient air rushes in to louvers 25, some of the particulate pollutants entering at each louver impinge on the rear surface of the succeeding louver, and are deflected upwardly, still with some tangential component of motion. These particles enter the small, initially radial supply of air through ports 32 and are carried with that air as it moves downwardly and then helically by merging with the principal flow so that not only the deflected particles but any particles originally entering through ports 32 are centrifugally separated and scavenged.

It will be evident that by reason of the purging sweep of air from ports 32 there is no possiblity for particulate matter to build up as a rotating mass at the top of the precleaner, since that area is continually swept by air entering radially through ports 32.

Numerous characteristics and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An engine intake cleaner, for ambient air bearing particulate pollutant matter, comprising a hollow body having a vertical axis and including a cylindrical wall, a solid top closure, and a bottom closure including an axial conduit for conducting air out of said body, said wall being provided with peripheral inlet means, between said top and said axial conduit, for admitting ambient air into said body in such a way that a principal portion of said air has downward and tangential components of motion, and a minor portion of the air has upward and tangential components of motion, whereby to establish a principal downward helical flow of said air in said body for centrifugal loss of particulate matter by contact with said wall below said inlet means, and to favor the formation of a continuous eddy of said air above said inlet means, said wall being further provided with bleeder means for admitting a radial flow of ambient air into said body proximate said top, whereby to inhibit the formation of said eddy, and means for receiving said particulate matter from said downward helical flow of air.

2. A cleaner according to claim 1 in which said peripheral inlet means comprises a plurality of inwardly formed air inlet louvers extending along the surface of said body in a peripheral band about said body below said top and above said axial conduit, the outer surface of each said louver functioning to impart to air passing therethrough into said body downward and tangential components of motion, whereby a principal portion of the air in said body exhibits a downward helical flow for centrifugal loss of particulate matter therefrom by contact with said wall below said inlet means, and the inner surface of each louver functioning to impart to a minor portion of the air entering through an adjacent louver upward and tangential components of motion, whereby to favor the formation of said continuous eddy of said air above said inlet means.

3. The apparatus according to claim 2 wherein said means for receiving said particulate matter comprise a tangential scavenge outlet at the bottom of said body for removing said particulate matter from said hollow body.

4. A structure according to claim 3 in which the areas of said peripheral inlet means and said bleeder means are in the ratio of approximately 15 to 1.

5. Apparatus according to claim 1 in which said solid top closure of said body includes a rain cap overhanging said bleeder means and at least a portion of said peripheral inlet means.

6. The structure of claim 1 in which said bleeder means comprises a plurality of apertures positioned symmetrically about said axis.

7. In combination with an engine air inlet:

an air cleaner comprising a hollow body having a vertical axis and including a cylindrical wall, a solid top closure, and a bottom closure including an axial conduit for conducting air out of said body;

said wall being provided with peripheral inlet means, between said top and said axial conduit, for admitting ambient air into said body in such a way that a principal portion of said air has downward and tangential components of motion, and a minor portion of the air has upward and tangential components of motion, whereby to establish a principal downward helical flow of said air in said body for centrifugal loss of particulate matter by contact with said wall below said inlet means, and to favor the formation of a continuous eddy of said air above said inlet means, said wall being further provided with bleeder means for admitting a radial flow of ambient air into said body proximate said top, whereby to inhibit the formation of said eddy, said air cleaner further including means for removing said particulate matter from said downward helical flow of air.

8. The apparatus according to claim 7 in which said peripheral inlet means comprises a plurality of inwardly formed air inlet louvers extending along the surface of said body in a peripheral band about said body below said top and above said axial conduit, the outer surface of each said louver functioning to impart to air passing therethrough into said body downward and tangential components of motion, whereby a principal portion of the air in said body exhibits a downward helical flow for centrifugal loss of particulate matter therefrom by contact with said wall below said inlet means, and the inner surface of each louver functioning to impart to a minor portion of the air entering through an adjacent louver upward and tangential components of motion, whereby to favor the formation of said continuous eddy of said air above said inlet means.

9. In an engine air cleaner comprising a hollow body having a vertical axis and including a cylindrical wall, a solid top closure, and a bottom closure including an axial conduit for conducting air out of said body, said wall being provided with peripheral inlet means, between said top and said axial conduit, for admitting ambient air into said body in such a way that a principal portion of said air has downward and tangential components of motion, whereby to establish a principal downward helical flow of said air in said body for centrifugal loss of particulate matter by contact with said wall below said inlet means, and to favor the formation of a continuous eddy of said air above said inlet means, means for removing said particulate matter from said air cleaner, the improvement comprising bleeder means in said wall for admitting a radial flow of ambient air into said body proximate said top, whereby to inhibit the formation of said eddy.

10. A method of cleaning ambient air of particulate pollutants for an engine which comprises the steps of simultaneously establishing coaxial primary and secondary helical flows of air having respectively downward and upward components of motion and having tangential components of motion in the same direction, removing said particulate matter from said primary helical flow, whereby said primary flow favors centrifugal removal of particulate matter therefrom and said secondary flow favors the establishment of a continuous eddy above said primary flow, and simultaneously introducing a radial flow of said ambient air into said eddy near the top thereof, whereby to inhibit the formation of said eddy and promote the blending of said primary and secondary flows and feeding the cleaned air into an engine intake.

11. A method of cleaning air centrifugally for use by an engine, said method comprising the steps of admitting primary pollutant ladened ambient air tangentially to a centrifugal cleaner with a small portion of said air being directed upward circumferentially and withdrawing the air from the bottom of the cleaner so that air follows a helically downward path in the cleaner, pollutants contained in the air being centrifugally thrown radially outwardly and thereafter being swept away in a scavenging air flow, and admitting a minor quantity of secondary ambient air to said cleaner radially at the top thereof to prevent the formation of a pollutant laden zone near the top of the cleaner by the sweeping action of said secondary air causing the zone to be swept downward and back into said helical path and feeding the cleaned air into an engine intake.

* * * * *